US010011732B2

(12) United States Patent
Buri et al.

(10) Patent No.: US 10,011,732 B2
(45) Date of Patent: Jul. 3, 2018

(54) PROCESS OF MANUFACTURE OF PARTICLES WITH A NATURAL CALCIUM CARBONATE AND ETHYLENE ACRYLIC ACID SALTS BASE, SUSPENSIONS AND DRY PIGMENTS OBTAINED, THEIR USES

(71) Applicant: Omya International AG, Oftringen (CH)

(72) Inventors: Matthias Buri, Rothrist (CH); Patrick A. C. Gane, Rothrist (CH); Philipp Hunziker, Böckten (CH); René Burkhalter, Herzogenbuchsee (CH); Beat Karth, Oberoenz (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/267,984

(22) Filed: Sep. 16, 2016

(65) Prior Publication Data

US 2017/0015859 A1 Jan. 19, 2017

Related U.S. Application Data

(62) Division of application No. 12/087,555, filed as application No. PCT/IB2007/000076 on Jan. 9, 2007, now Pat. No. 9,944,815.

(30) Foreign Application Priority Data

Jan. 19, 2006 (FR) ..................................... 06 00491

(51) Int. Cl.
| | |
|---|---|
| *C09D 123/08* | (2006.01) |
| *C09D 17/00* | (2006.01) |
| *C08K 3/22* | (2006.01) |
| *C08K 3/26* | (2006.01) |
| *C01F 11/18* | (2006.01) |
| *C09C 1/02* | (2006.01) |
| *C09C 3/10* | (2006.01) |

(52) U.S. Cl.
CPC ...... *C09D 123/0869* (2013.01); *C01F 11/185* (2013.01); *C08K 3/22* (2013.01); *C08K 3/26* (2013.01); *C09C 1/021* (2013.01); *C09C 3/10* (2013.01); *C09D 17/001* (2013.01); *C01P 2004/61* (2013.01); *C01P 2004/62* (2013.01); *C01P 2004/80* (2013.01); *C01P 2006/22* (2013.01); *C01P 2006/32* (2013.01); *C08K 2003/2244* (2013.01); *C08K 2003/265* (2013.01); *C08K 2201/003* (2013.01)

(58) Field of Classification Search
CPC . C01F 11/185; C01P 2004/61; C01P 2004/62; C01P 2004/80; C01P 2006/22; C01P 2006/32; C08K 2003/265; C08K 3/26; C09C 1/021; C09C 3/10

See application file for complete search history.

(56) References Cited

U.S. PATENT DOCUMENTS

| | | | |
|---|---|---|---|
| 3,238,049 A | 3/1966 | Somers | |
| 3,843,380 A | 10/1974 | Beyn | |
| 4,013,602 A | 3/1977 | Delfosse et al. | |
| 4,370,171 A | 1/1983 | Robinson et al. | |
| 5,449,402 A | 9/1995 | Whalen-Shaw | |
| 5,631,045 A | 5/1997 | Yaniv | |
| 5,961,836 A | 10/1999 | Egraz et al. | |
| 6,808,809 B2 | 10/2004 | Herbiet et al. | |
| 6,946,510 B2 * | 9/2005 | Suau ................... | B01F 17/0028 106/465 |
| 7,470,739 B2 | 12/2008 | Gane et al. | |
| 7,514,488 B2 | 4/2009 | Gane et al. | |
| 7,825,192 B2 | 11/2010 | Gene et al. | |
| 8,080,595 B2 | 12/2011 | Gane et al. | |
| 2003/0045647 A1 | 3/2003 | Suau et al. | |
| 2004/0077762 A1 | 4/2004 | Mongoin et al. | |
| 2006/0094636 A1 | 5/2006 | Rodrigues et al. | |
| 2006/0111488 A1 | 5/2006 | Zhang et al. | |

FOREIGN PATENT DOCUMENTS

| | | |
|---|---|---|
| JP | 4031319 A | 2/1992 |
| WO | 9311183 | 6/1993 |
| WO | 9713815 A2 | 4/1997 |
| WO | 02096982 A1 | 12/2002 |
| WO | 2006008657 A2 | 1/2006 |

OTHER PUBLICATIONS

English Translation of Office Action dated Jul. 16, 2012 for JP 2008-550865.
International Search Report for PCT Application No. PCT/IB2007/000076.

* cited by examiner

*Primary Examiner* — Shuangyi Abu Ali
(74) *Attorney, Agent, or Firm* — Amster, Rothstein & Ebenstein LLP

(57) ABSTRACT

The present invention consists of a process of preparation of at least one mineral matter and/or of at least one pigment, including a calcium carbonate made at once partially organophilic and partially hydrophilic, in which the carbonate is blended and/or ground and/or concentrated in an aqueous medium, in the presence of at least one salt of ethylene acrylic acid, one dispersing agent and/or one grinding aid agent, which is introduced before and/or during this treatment stage. Another object of the invention lies in the aqueous dispersions and suspensions of calcium carbonate thus obtained. They may be dried and the dry pigments obtained also constitute an object of the invention. Use of these aqueous dispersions and these dry pigments in the field of plastic, paints and paper constitutes another object of the invention.

29 Claims, No Drawings

PROCESS OF MANUFACTURE OF PARTICLES WITH A NATURAL CALCIUM CARBONATE AND ETHYLENE ACRYLIC ACID SALTS BASE, SUSPENSIONS AND DRY PIGMENTS OBTAINED, THEIR USES

CROSS-REFERENCE TO RELATED APPLICATIONS

This is a divisional of U.S. application Ser. No. 12/087,555, filed Sep. 12, 2008, which is a U.S. National phase of PCT Application No. PCT/IB2007/000076, filed Jan. 9, 2007, which claims priority to French Application No. 0600491, filed Jan. 19, 2006, the contents of which are hereby incorporated by reference.

The first object of the present invention consists of a process of preparation of at least one mineral matter and/or at least one pigment, including a natural and/or precipitated calcium carbonate, preferentially natural, made at once partially organophilic and partially hydrophilic, and including the stages of:
  a) supplying at least one mineral matter and/or at least one pigment containing natural and/or precipitated calcium carbonate, in a dry form or in the form of an aqueous dispersion and/or suspension,
  b) possibly dry grinding and/or grinding in an aqueous medium the mineral matter and/or the pigment resulting from stage a),
  c) treating the mineral matter and/or the pigment resulting from stage a) and/or from stage b),
  d) possibly drying the mineral matter and/or the pigment resulting from stage a) and/or b) and/or c),
characterised in that:
  treatment stage c) corresponds to a stage of blending in an aqueous medium and/or of grinding in an aqueous medium, and/or of concentration in an aqueous medium, of the mineral matter and/or the pigment obtained from stage a) and/or from stage b), in the presence of at least one salt of ethylene acrylic acid,
  a dispersing agent and/or grinding aid agent is introduced before and/or during the treatment stage c).

A second object of the present invention lies in the aqueous suspensions and dispersions obtained by the said process.

A third object of the present invention lies in the dry products obtained by the said process.

A fourth object of the present invention lies in the use of the said aqueous suspensions and the said aqueous dispersions and the said dry products in the manufacture of plastics, paints and papers, and notably in plastic or paper coatings, and also in plastic or paper mass fillings.

The aim of the process is essentially the processing and/or economic production of a mineral matter and/or a pigment including a natural and/or precipitated calcium carbonate.

The process according to the invention notably enables the skilled man in the art to obtain a dispersion of mineral matter and/or of pigment treated in this manner with a high dry extract (an expression which will be repeated throughout the present Application, and defined as the percentage by dry weight of mineral matter and/or of pigment relative to the total weight of the said dispersion).

A high dry extract, and notably one greater than 65%, preferentially 70%, very preferentially greater than 75%, of the total weight of the said dispersion leads to a reduction of the costs of transport of such a dispersion, and to a reduction of the drying costs of such a dispersion.

The process according to the invention notably enables such dry extracts to be obtained, whilst retaining for the said dispersion advantageous rheological properties, since the said dispersion remains easily able to be handled, and which prevents the significant presence of agglomerates.

A second aim is to give the skilled man in the art the possibility of treating the mineral matter and/or the pigment containing a natural and/or precipitated calcium carbonate to make it at once partially organophilic and partially hydrophilic, both during a grinding stage, and during a blending stage, and during a concentration stage, which are the stages traditionally implemented during the overall process of manufacture of an aqueous dispersion of mineral matter: these different possibilities all constitute flexibility made available to the skilled man in the art.

A calcium carbonate made organophilic in this manner may be used advantageously in the plastics field; furthermore, its hydrophilic character will enable it to be dispersed at high concentration in water, i.e. aqueous dispersions or suspensions of calcium carbonate to be obtained of which the dry weight content of mineral matter will notably be greater than 65% of their total weight, whilst having advantageous rheological properties without the formation of agglomerates.

In plastics, such as notably thermoplastic resins or thermosetting resins, mineral matter and/or pigments are commonly incorporated, such as, for example, natural or precipitated calcium carbonate, the dolomites, magnesium hydroxide, kaolin, talc, gypsum, or again titanium dioxide. This mineral matter and/or these pigments can improve particular properties of these plastics, such as, in the case of the use of calcium carbonate in PVC, increased rigidity, improved thermal exchanges during extrusion, or again reduced deposit on die-removal. The Applicant may in this respect quote the document "The use of calcium carbonate to enhance the physical properties of rigid vinyl products" (Society of Plastic Engineers, Conf., 12-14 Oct. 1999). Furthermore, it is also common to replace part of the plastic resins, which are expensive materials, by these pigments and/or this mineral matter.

In connection with the use of calcium carbonate in plastics, the skilled man in the art—who is a manufacturer of mineral matter notably with a view to its use in plastics—knows that in order to improve the compatibility of the said carbonate with the plastic in which it is incorporated it is necessary to treat the calcium carbonate. In relation thereto, it has been known for many years to use derivatives of fatty acids as a treatment agent of calcium carbonate, since these fatty acids notably have 10 to 20 carbon atoms, and more specifically 16 to 18 carbon atoms, in a saturated carbon structure (such as stearic acid), palmitic acid and/or stearic acid and their salts, which are the agent or agents preferentially used by the skilled man in the art.

It is important to indicate that the calcium carbonate is prepared according to various stages of manufacture in an aqueous medium, such as stages of dispersion, grinding or again concentration. The product resulting from the stages is an aqueous dispersion or suspension of calcium carbonate, possibly containing different dispersing agents and/or grinding aid agents and/or treatment agents introduced in the course of these different stages.

Generally, when stearic acid is added (either in the molten state, or in the form of an emulsion) into a dispersion or suspension of calcium carbonate, or to dry calcium carbonate, an additional stage of disaggregation must be undertaken following this addition.

In the case of the use of an emulsion of stearic acid, in which an emulsifier may be introduced in order to stabilise this emulsion, the presence of the emulsifier may cause the destabilisation of the dispersion or of the suspension of calcium carbonate, which leads to the formation of flocculated particles and/or floating particles. This emulsifier has the additional drawback that it causes foam to be created in the dispersion or the suspension.

This brings up a first drawback relating to the use of stearic acid: it requires the addition of additional stages and/or additives, sometimes with negative consequences during the treatment process.

Nor does selecting a treatment undertaken with salts of stearic acid, as neutralised with calcium ions, lead to the solution sought by the skilled man in the art: it also has the drawback of leading to the creation of foam in the dispersion or suspension of calcium carbonate.

Finally, it appears that the use of stearic acid or of its salts does not enable aqueous suspensions or dispersions of calcium carbonate to be obtained having a concentration by weight of dry mineral matter greater than 65% of the total weight of the said dispersion or suspension with a usable viscosity and/or without the creation of agglomerates which lead to the presence of residues retrieved on the filtration screens. And calcium carbonate is commonly manufactured according to the previously described stages, transported in the form of an aqueous dispersion or suspension, possibly stored in this same form, and finally dried before being incorporated in the plastic. For economic reasons, it is essential for the skilled man in the art to manufacture and deliver to the end transformer an aqueous dispersion or suspension of calcium carbonate having as high as possible a dry extract, whilst maintaining a satisfactory viscosity and/or without significant creation of agglomerates, and thus residues retrieved on the screen, which the use of stearic acid or its salts does not permit.

Seeking to resolve these different drawbacks relating to the use of stearic acid or of its salts, in order to treat, so as to make it at once partially organophilic and partially hydrophilic, a mineral matter (and notably calcium carbonate) with a view to its incorporation in plastics and with a view to manufacturing it economically, the Applicant has developed a new process for preparation of at least one mineral matter and/or at least one pigment including natural and/or precipitated calcium carbonate which is at once partially organophilic and partially hydrophilic, and comprising the stages of:

a) supplying at least one mineral matter and/or one pigment containing natural and/or precipitated calcium carbonate, in a dry form or in the form of a dispersion and/or an aqueous suspension, b) possibly dry grinding and/or grinding in an aqueous medium the mineral matter and/or the pigment resulting from stage a), c) treating the mineral matter and/or the pigment resulting from stage a) and/or from stage b), d) possibly drying the mineral matter and/or the pigment resulting from stage a) and/or b) and/or c), characterised in that:

treatment stage c) corresponds to a stage of blending in an aqueous medium and/or of grinding in an aqueous medium, and/or of concentration in an aqueous medium, of the mineral matter and/or the pigment obtained from stage a) and/or from stage b), in the presence of at least one salt of ethylene acrylic acid, a dispersing agent and/or grinding aid agent is introduced before and/or during the treatment stage c).

Such a process therefore enables, in a very surprising manner, the treatment agent to be incorporated in order to manufacture suspensions of natural and/or precipitated calcium carbonate with dry extracts higher than those obtained by the processes of the prior art using stearic acid or its salts, whilst maintaining a satisfactory viscosity and/or without the significant creation of agglomerates and thus residues retrieved on the screen, and without the drawbacks of this prior art.

It is notably very surprising that, if the salts of ethylene acrylic acid are added during or after the addition of dispersing agent, its salts do not influence in a negative fashion the rheological properties of the dispersions obtained: indeed, one succeeds surprisingly, using the process according to the invention, in obtaining high dry extracts (notably greater than 65%) with satisfactory rheological properties and without the formation of agglomerates.

At the same time, it is very surprising that the dispersing agent (which is added before or during the introduction of the ethylene acrylic acid salts) does not prevent the interaction between the said salts and the surface of the calcium carbonate in order to make it organophilic: indeed, one succeeds surprisingly, using the process according to the invention, in manufacturing calcium carbonate particles which are dispersible in plastics.

The Applicant wishes to indicate that there are a number of documents relating to the use of ethylene acrylic acid in a process of manufacture of calcium carbonate. On this subject, he wishes to emphasise:

firstly, that none of these documents seeks to resolve the same technical problem as that of the present Application, moreover, that none of these documents reveals the technical solution of the present Application, which consists in the process described above, in addition, that nothing suggested in one of these documents, or in possible combinations of one or more of these documents mutually or with other documents, the process according to the invention; and that on the contrary the teaching of these documents could not lead the skilled man in the art to the process forming the subject of the present invention.

These arguments will now be developed with regard to the content and the teaching revealed by each of the documents relating to the use of ethylene acrylic acid in the course of a process of manufacture of calcium carbonate.

The skilled man in the art is familiar with document U.S. Pat. No. 6,808,809 which seeks to resolve the technical problem of manufacturing a mineral filler notably having good flowability; in relation thereto, this document does not in any way resolve the same technical problem as that forming the subject of the present Application. The solution which it proposes consists in introducing into a dryer an aqueous suspension of mineral filler (such as calcium carbonate) having an average diameter of less than 15 μm, and an aqueous dispersion of a polymer (such as notably ethylene acrylic acid). This document indicates that the suspension of mineral filler may have a dry extract of between 10% and 90% of the total weight of the said suspension; however, only example 1 produced in the case of aluminium trihydroxide reveals a dry extract value, equal only to 55%. Nothing is, moreover, indicated concerning the viscosity of the suspensions obtained, nor concerning the possibility of reducing the quantity of agglomerates of mineral matter. The Applicant stresses that in no case does this document reveal the use of ethylene acrylic acid in the form of salts, which therefore constitutes an element of distinction with the present invention. Finally, nothing suggests to the skilled man in the art that he should attach particular importance to the use of a dispersing agent in this document, and all the more so to the use of a dispersing agent before the use of ethylene acrylic acid in the form of salts; similarly, nothing suggests in this document—centred around a drying process—a process according to the invention which offers the possibility of treating a calcium carbonate both during a grinding stage and a blending and concentration stage, in the presence of at least one salt of ethylene acrylic acid, and of a dispersing agent or grinding aid agent used before the stage of treatment of calcium carbonate.

The skilled man in the art is also familiar with document WO 93/11183 which seeks to resolve the technical problem of improving the dispersion of inorganic particles in different materials, such as paints, adhesives, putties, or again binders for non-woven materials; this is therefore a technical problem different to the one resolved by the present Application, since it does not address notably the question of manufacturing suspensions of mineral matter having a high dry extract. The described solution consists of a process of preparation of a stable aqueous dispersion, by the blending of an aqueous suspension of inorganic particles (such as calcium carbonate) and of an aqueous suspension of polymeric latex particles, after having adjusted their zeta potentials. The ethylene acrylic acid is described as one of the polymers which can be used, without it ever been exemplified, and without it ever being particularly distinguished among all the usable polymers. In addition, the examples demonstrate that the resulting suspensions have low dry extracts, always less than 60% by dry weight of mineral particles relative to the total weight of the said suspensions. A fundamental element of distinction with the present invention is that this document never mentions the presence of salts of ethylene acrylic acid. Finally, nothing suggests to the skilled man in the art that he should attach particular importance to the use of a dispersing agent in this document, and all the more so to the use of a dispersing agent before the use of ethylene acrylic acid in the form of salts; similarly, nothing suggests in this document—centred around a blending process—a process according to the invention which offers the possibility of treating a calcium carbonate both during a grinding stage and a blending and concentration stage, in the presence of at least one salt of ethylene acrylic acid, and of a dispersing agent or grinding aid agent used before the stage of treatment of calcium carbonate.

The skilled man in the art is also familiar with document WO 97/13815 which seeks to resolve the technical problem of manufacturing powders compatible with plastics (but also paints and paper), of preventing the coalescence of the particles which constitute such powders, of making the surface of the calcium carbonate hydrophobic; as such, this document resolves only partially the problem forming the subject of the present Application. Indeed, the solution which it proposes does not enable aqueous suspensions of calcium carbonate to be obtained with a dry extract greater than 65% relative to the total weight of the said suspensions, as is notably demonstrated by the results of table 2 on page 29. In addition, the proposed solution consists in dissolving, initially, a polymer (such as ethylene acrylic acid) in a medium containing carboxylic acid, and then in bringing the product obtained into contact with calcium carbonate in such a way as to cause it to precipitate on the latter: this stage of the solution constitutes a fundamental element of differentiation with the present invention. In addition, this stage of dissolution, when it uses long-chain carboxylic acids, will lead to the same problems as those resulting from the use of stearic acid, namely the need for an additional stage of disagglomeration and/or addition of additional additives of calcium carbonate particles. This same stage of dissolution, when it uses carboxylic acids with shorter chains, will lead to the flocculation of the calcium carbonate particles, and will not therefore enable aqueous suspensions with a high dry extract, and notably greater than 65% of the total weight of the said suspensions, to be obtained. These carboxylic acids with shorter chains can also destroy the calcium carbonate particles, and even generate carbon dioxide. Finally, these short-chain carboxylic acids can reduce the resistivity and increase the conductivity of the plastics in which the calcium carbonates according to the invention are finally used. Finally, nothing suggests to the skilled man in the art that he should attach particular importance to the use of a dispersing agent in this document, and all the more so to the use of a dispersing agent before the use of ethylene acrylic acid in the form of salts; similarly, nothing suggests in this document—centred around a blending process—a process according to the invention which offers the possibility of treating a calcium carbonate both during a grinding stage and a blending and concentration stage, in the presence of at least one salt of ethylene acrylic acid, and of a dispersing agent or grinding aid agent used before the stage of treatment of calcium carbonate.

The skilled man in the art is also familiar with document WO 02/96982 which seeks to resolve the technical problem of manufacturing a organic-inorganic nano-composite material, whilst strengthening within this said material the compatibility between the organic particles and the inorganic particles; as such, this document does not resolve the same technical problem as that forming the subject of the present Application. The solution which it proposes consists in forming a blend between a mineral particle (such as calcium carbonate) and a polymer solution (such as, for example, one with an ethylene acrylic acid base) in the presence of solvents, in evaporating the solvents, and in blending the product obtained with a polymer resin. This document gives no indication concerning the dry extracts of the blends of mineral particles and polymers. Furthermore, it has the drawback of using solvents (such as notably THF and ethanol), the presence of which is undesirable for the skilled man in the art, notably because they will engender a high rate of volatile organic carbon (VOC) in the atmosphere. Finally, this process is different from that forming the subject of the present invention, since it does not mention the presence of a dispersing agent. Finally, nothing suggests in this document—which is centred around a blending process—a process according to the invention which offers the possibility of treating calcium carbonate both during a grinding stage and during a blending or concentration stage, in the presence of at least one salt of ethylene acrylic acid, and one dispersing agent or grinding aid agent used before the stage of treatment of calcium carbonate.

The skilled man in the art is also familiar with document U.S. Pat. No. 5,449,402 which seeks to resolve the technical problem of binding irreversibly a mineral filler and an organic modifier, which are then used in the composition of aqueous linings, the opacity and brightness of which are improved; as such, this document absolutely does not resolve the same technical problem as the one forming the subject of the present Application. The solution which it proposes consists in manufacturing a pigment from calcium carbonate particles in the flocculated state and from an anionic modifying agent (such as polymers, and notably ethylene acrylic acid), in which the calcium carbonate and the modifying agent are then bound to one another by electrostatic links. The general teaching this document is that, in order to treat a calcium carbonate notably with a solution of ethylene acrylic acid, it is preferable to have initially one pigment in a flocculated form (column 4, lines 39 to 62), and not a dispersed pigment (as indicated explicitly on line 50 of column 4), where this dispersed state is defined as resulting from the addition of an agent having led to a reduction of the viscosity or to a reduction of the sizes of the particles (column 1, lines 15 to 25). A dispersing agent such as sodium polyacrylate can subsequently be added after the introduction of the solution of ethylene acrylic acid (column 4, lines 63 to 65). Consequently, the skilled man in the art is strongly encouraged not to use a dispersing agent before the treatment of the calcium carbonate by a solution of ethylene acrylic acid. This dispersed state, as defined in document U.S. Pat. No. 5,449,402 as resulting from the addition of an agent leading to a reduction of viscosity or to a reduction of the size of the particles, is therefore undesired in this document; however, it forms part of one of the fundamental characteristics of the present invention. Finally, the Applicant was able to observe that, in a surprising manner since it was completely contrary to the teaching of the prior art, the introduction of a dispersing agent necessarily before or during the addition of salts of ethylene acrylic acid to treat the calcium carbonate, enables by this means the calcium carbonate to be made at once partially organophilic and partially hydrophilic, without using stearic acid, enables aqueous suspensions to be obtained with a high dry extract and a satisfactory rheology and without agglomerates, and enables the skilled man in the art to be given a very flexible process, since the ethylene acrylic acid can be used either during a stage of grinding, or of blending, or of concentration.

Therefore, none of the documents available to the skilled man in the art concerning the use of ethylene acrylic acid concerns the same technical problem as the one resolved by the present Application.

Similarly, none of them reveals the technical solution forming the subject of the present Application.

Finally, none of them, nor mutual combinations of them, nor combinations with other documents, suggests the technical solution forming the subject of the present Application.

One of the merits of the Applicant notably resides in the fact that he was able to observe that the following particular choices:
the use of salts of ethylene acrylic acid to treat a natural and/or precipitated calcium carbonate,
the addition of a dispersing agent and/or grinding aid agent before and/or during the stage of treatment of the calcium carbonate by salts of ethylene acrylic acid (which is contrary to the teaching of the state of the technique),
enable in a surprising manner the development of a process:
which avoids the drawbacks relating to the use of stearic acid (a stage of disagglomeration and of addition of additional additives), which represents a financial gain,
which enables aqueous suspensions of mineral matter with high dry extract to be obtained (notably greater than 65%) with a satisfactory rheology, and without the presence of agglomerates which would create residues on the filtration screens, representing a technical and economic interest,
which enables the skilled man in the art to be given a process in which he can treat calcium carbonate both during a stage of grinding and of blending or concentration in an aqueous medium, which represents very great flexibility.

In addition, this process enables a natural and/or precipitated calcium carbonate to be obtained which is at once partially organophilic and partially hydrophilic, which is very surprising.

It is notably very surprising that, if the salts of ethylene acrylic acid are added during or after the addition of dispersing agent, these salts do not influence in a negative fashion the rheological properties of the dispersions obtained: indeed, one succeeds surprisingly, using the process according to the invention, in obtaining high dry extracts (notably greater than 65%) with satisfactory rheological properties and without the formation of agglomerates.

At the same time, it is very surprising that the dispersing agent (which is added before or during the introduction of the ethylene acrylic acid salts) does not prevent the interaction between the said salts and the surface of the calcium carbonate in order to make it organophilic: indeed, one succeeds surprisingly, using the process according to the invention, in manufacturing calcium carbonate particles which are dispersible in plastics.

Finally, the Applicant wishes to indicate that he is familiar with French patent Application No. 04 07806, which has been filed but not yet published, and which therefore intervenes only as a novelty in order to assess the patentability of the present Application.

In this respect, French patent Application No. 04 07806 describes a process of preparation of self-binding pigmentary particles, which are either dry or in aqueous suspension or dispersion, including the following stages:
a) forming one or more aqueous suspensions of at least one inorganic matter and introducing it or them into a mill with a view to stage c),
b) forming or taking one or more aqueous solutions or suspensions or emulsions of at least one binder and introducing it or them into a mill with a view to stage c),
c) co-grinding the aqueous suspension or suspensions obtained in stage a) with the aqueous solutions or suspensions or emulsions obtained in stage b) so as to obtain an aqueous suspension of self-binding pigmentary particles,
d) possibly co-grinding the aqueous suspension obtained in stage c) with one or more aqueous solutions or suspensions or emulsions of at least one binder,
e) possibly drying the aqueous suspension obtained in stage c) or in stage d).

This process, as indicated in French patent Application No. 04 07806, spares the skilled man in the art from using a third constituent during the preparation of the aqueous suspensions containing the inorganic matter and the binders, and during the co-grinding stage: this therefore constitutes a fundamental difference with the present invention, which necessarily uses a dispersing agent and/or grinding aid agent before or during the stage of treatment of mineral matter by ethylene acrylic acid.

Therefore, a first object of the invention lies in a process of preparation of at least one mineral matter and/or at least one pigment, including a natural and/or precipitated calcium carbonate, preferentially natural, made at once partially organophilic and partially hydrophilic, and including the stages of:
a) supplying at least one mineral matter and/or one pigment including natural and/or precipitated calcium carbonate, preferentially natural, in a dry form or in the form of an aqueous dispersion and/or suspension, b) possibly dry grinding and/or grinding in an aqueous medium the mineral matter and/or the pigment resulting from stage a), c) treating the mineral matter and/or the pigment resulting from stage a) and/or from stage b), d) possibly drying the mineral matter and/or the pigment resulting from stage a) and/or b) and/or c), characterised in that:

treatment stage c) corresponds to a stage of blending in an aqueous medium and/or of grinding in an aqueous medium, and/or of concentration in an aqueous medium, of the mineral matter and/or the pigment obtained from stage a) and/or from stage b), in the presence of at least one salt of ethylene acrylic acid, a dispersing agent and/or grinding aid agent is introduced before and/or during the treatment stage c).

The Applicant recalls that, according to this process, the mineral matter and/or the pigment including at least one natural calcium carbonate, when it is present in the form of an aqueous dispersion or suspension, is not in the flocculated state, unlike that which is claimed by document U.S. Pat. No. 5,449,402.

The process according to the invention is also characterised in that the ethylene acrylic acid salt is a salt which is soluble in aqueous media.

The process according to the invention is also characterised in that the carboxylic groupings of the ethylene acrylic acid salt are partially or totally dissociated from their acid proton.

The process according to the invention is also characterised in that, in the ethylene acrylic acid salt, the mass ratio of ethylene monomer to acrylic acid monomer is between 10:90 and 30:70, and is preferentially equal to 20:80.

The process according to the invention is also characterised in that the ethylene acrylic acid salt has a melt index of between 50 g/10 minutes and 1,500 g/10 minutes, preferentially between 200 g/10 minutes and 300 g/10 minutes when the ethylene acrylic acid salt is totally neutralised, and preferentially between 1,000 g/10 minutes and 1,400 g/10 minutes when the ethylene acrylic acid salt is neutralised at a rate of 70 to 99% (as a proportion of the carboxylic sites of the ethylene acrylic acid), measured according to norm ASTM1238 125° C./2.16 kg.

The process according to the invention is also characterised in that the carboxylic groupings of the said ethylene acrylic acid salts are entirely neutralised or neutralised at a rate of 70 to 99% relative to the total number of the carboxylic sites of the ethylene acrylic acid, with at least one neutralisation agent.

The process according to the invention is also characterised in that the said neutralisation agent includes at least one monovalent cation.

The process according to the invention is also characterised in that the said monovalent cation includes one or more alkali ions and/or one or more amines and/or ammonia.

The process according to the invention is also characterised in that the said alkaline monovalent ion includes a sodium ion.

The process according to the invention is also characterised in that the said amine includes a primary amine.

The process according to the invention is also characterised in that the said amine includes an alkanolamine, including at least one ethanol and/or propanol grouping, and in that the said alkanolamine is then preferentially chosen from among 2-amino-2-methyl-1-propanol and/or dimethylethanolamine, and in that it is very preferentially 2-amino-2-methyl-1-propanol.

The process according to the invention is also characterised in that a quantity of 2-amino-2-methyl-1-propanol is used, so as to contribute a proportion of monovalent cation of between 75 and 125% of the carboxylic groupings of the ethylene acrylic acid, and preferentially so as to contribute a proportion of monovalent cation equal to 100% of the carboxylic groupings of the ethylene acrylic acid.

The process according to the invention is also characterised in that a quantity of dimethyl ethanolamine is used, so as to contribute a proportion of monovalent cation of between 75 and 125% of the carboxylic groupings of the ethylene acrylic acid, and preferentially so as to contribute a proportion of monovalent cation equal to 100% of the carboxylic groupings of the ethylene acrylic acid.

The process according to the invention is also characterised in that the said ethylene acrylic acid has a viscosity of 3,000 to 25,000 mPa·s, 15,000 to 100,000 mPa·s, and 50,000 to 400,000 mPa·s at respective temperatures of 200° C., 170° C. and 140° C.

In a particular embodiment, the process according to the invention is characterised in that the said ethylene acrylic acid has a viscosity of 3,000 to 7,000 mPa·s, 15,000 to 20,000 mPa·s, and 50,000 to 100,000 mPa·s at respective temperatures of 200° C., 170° C. and 140° C.

In another particular embodiment, the process according to the invention is characterised in that the said ethylene acrylic acid has a viscosity of 15,000 to 25,000 mPa·s, 50,000 to 100,000 mPa·s, and 300,000 to 400,000 mPa·s at respective temperatures of 200° C., 170° C. and 140° C.

The process according to the invention is also characterised in that the mineral matter and/or the pigment includes, in addition to calcium carbonate, also at least one other mineral matter and/or pigment chosen from among the dolomites, the bentonites, kaolin, talc, cement, gypsum, lime, magnesia, titanium dioxide, satin white, aluminium trioxide, or again aluminium trihydroxide, the silicas, mica and a blend of these fillers one with another, such as talc-calcium carbonate blends, calcium carbonate-kaolin blends, or again blends of calcium carbonate with aluminium trihydroxide or aluminium trioxide, or again blends with synthetic or natural fibres, or again mineral costructures such as talc-calcium carbonate costructures or talc-titanium dioxide costructures, or their blends, and in that this other mineral matter is preferentially kaolin.

The process according to the invention is also characterised in that the quantity by dry weight of calcium carbonate is greater than or equal to 70% of the total dry weight of pigments and/or of mineral matter.

The process according to the invention is also characterised in that, during stage a) and when the mineral matter and/or the pigment is present in the form of an aqueous dispersion and/or suspension, the concentration by dry weight of pigment and/or mineral matter is greater than 60%, preferentially 65%, very preferentially greater than 70%, most preferentially is between 74% and 78% of the total weight of the said dispersion and/or suspension, or in that the concentration by dry weight of pigment and/or mineral matter is less than 30%, preferentially between 18 and 22%, of the total weight of the said dispersion and/or suspension, and in that the said dispersion and/or suspension is a suspension containing no dispersing agent.

The Applicant stresses that these limitations apply to stage a), and not to the aqueous dispersion and/or suspension obtained after stage c), the dry extract of which it is necessarily sought to increase, which forms part of one of the aspects of the technical problem resolved by the present Application.

The process according to the invention is also characterised in that the grinding stage b) is undertaken continuously or discontinuously, and preferentially continuously.

The process according to the invention is also characterised in that the grinding stage b) is undertaken in the presence of oxide-based and/or zirconium silicate-based grinding balls, possibly stabilised with a cerium and/or yttrium oxide.

In the embodiment according to which the grinding stage b) is dry grinding, the process according to the invention is also characterised in that the dry grinding stage leads to the production of mineral matter and/or pigments having an average diameter of less than 50 μm, preferentially less than 15 μm, very preferentially less than 5 μm, and even more preferentially in that the average diameter is between 1.3 and 1.7 μm, as measured using a Sedigraph™ 5100 device sold by the company MICROMERITICS™.

In the variant according to which the grinding stage b) is a grinding in an aqueous medium, the process according to the invention is also characterised in that this grinding stage in an aqueous medium leads to the production of mineral matter and/or pigments having a proportion of particles with a diameter of less than 2 μm greater than 60% (as measured by a Sedigraph™ 5100 device sold by the company MICROMERITICS™), or a proportion of particles with a diameter of less than 2 μm greater than 90% (as measured by a Sedigraph™ 5100 device sold by the company MICROMERITICS™), or a proportion of particles with a diameter of less than 2 μm greater than 99% (as measured by a Sedigraph™ 5100 device sold by the company MICROMERITICS™).

The process according to the invention is also characterised in that treatment stage c) leads to an aqueous dispersion and/or suspension of which the percentage by dry weight of mineral matter and/or of pigments is greater than 65%, preferentially greater than 70%, very preferentially greater than 75%, and most preferentially between 75 and 78%, of the total weight of the said dispersion and/or suspension.

The process according to the invention is also characterised in that treatment stage c) leads to an aqueous dispersion and/or suspension the mineral matter and/or the pigments of which have an average diameter of less than 50 μm, preferentially less than 15 μm, very preferentially less than 5 μm, and even more preferentially in that the average diameter is between 0.3 and 1.7 μm, and most preferentially is between 0.5 and 0.9 μm, as measured by a Sedigraph™ 5100 device sold by the company MICROMERITICS™.

The process according to the invention is also characterised in that treatment stage c) leads to an aqueous dispersion and/or suspension having a proportion of particles with a diameter of less than 2 μm greater than 60% (as measured by a Sedigraph™ 5100 device sold by the company MICROMERITICS™), or a proportion of particles with a diameter of less than 2 μm greater than 90% (as measured by a Sedigraph™ 5100 device sold by the company MICROMERITICS™), or a proportion of particles with a diameter of less than 2 μm greater than 99% (as measured by a Sedigraph™ 5100 device sold by the company MICROMERITICS™).

The process according to the invention is also characterised in that treatment stage c) leads to an aqueous dispersion and/or suspension having a Brookfield™ viscosity measured at 100 revolutions/minute (measured at 25° C., with mobile No. 3, and with device DVII+ in a 1-liter container) of less than 1,000 mPa·s, preferentially less than 700 mPa·s, very preferentially less than 500 mPa·s, and even more preferentially in that this viscosity is between 100 and 300 mPa·s.

The process according to the invention is also characterised in that treatment stage c) leads to an aqueous dispersion and/or suspension having a screen residue greater than 45 μm of less than 100 ppm, preferentially of less than 70 ppm, more preferentially of less than 60 ppm, and most preferentially of less than 50 ppm.

The process according to the invention is also characterised in that stage c) is preferentially a stage of grinding in an aqueous medium.

The process according to the invention is also characterised in that drying stage d) is undertaken preferentially after treatment stage c).

The process according to the invention is also characterised in that the drying is undertaken by a dryer-atomiser.

The process according to the invention is also characterised in that the dispersing agent and/or grinding aid agent in an aqueous medium, introduced during or before stage c), is a homopolymer of acrylic acid and/or a copolymer of acrylic acid with another water-soluble monomer chosen from among methacrylic acid, maleic acid, itaconic acid, crotonic acid, fumaric acid, isocrotonic acid, aconitic acid, mesaconic acid, sinapic acid, undecylenic acid, angelic acid, canellic acid and/or 2-acrylamido 2-methyl propane sulfonic acid in acid form or partially neutralised, or again from among acrylamide, methylacrylamide, the esters of the acrylic or methacrylic acids such as acrylate phosphate or ethylene methacrylate or propylene glycol, or again from among vinylpyrrolidone, vinylcaprolactame, vinyl acetate, sodium styrene sulfonate, allylamine and its derivatives, and preferentially in that the dispersing agent and/or grinding aid agent is one chosen from among the copolymers of acrylic acid with acrylamide or maleic acid.

The process according to the invention is also characterised in that the dry grinding agent used in stage b) of grinding, when the latter is dry grinding, is chosen from among the glycol-based compounds, and preferentially from among ethylene glycol, diethylene glycol or monopropylene glycol, and in that it is preferentially a monopropylene glycol of molecular weight of between 200 and 1,000 g/mole.

The process according to the invention is also characterised in that the total proportion of ethylene acrylic acid is between 0.1 and 10%, preferentially between 0.2 and 2%, and is very preferentially equal to 0.5 to 1% of the dry weight of pigments and/or of mineral matter.

The process according to the invention is also characterised in that the total proportion of dispersing agent and/or grinding aid agent is between 0.1 and 2%, preferentially between 0.2 and 1.5%, and is very preferentially between 0.3 and 0.6% of the dry weight of pigments and/or of mineral matter.

The process according to the invention is also characterised in that the quantity by weight of ethylene acrylic acid is approximately equal to the quantity by weight of dispersing agent and/or grinding aid agent, when the ethylene acrylic acid is neutralised with 2-amino-2-methyl-1-propanol.

The process according to the invention is also characterised in that the quantity by weight of ethylene acrylic acid is approximately equal to half the quantity by weight of dispersing agent and/or grinding aid agent, when the ethylene acrylic acid is neutralised with sodium.

Another object of the invention lies in aqueous suspensions and/or dispersions of pigments and/or of mineral matter, characterised in that they are obtained by the process according to the invention.

Another object of the invention lies in the aqueous suspensions and/or dispersions of pigments and/or of mineral matter characterised in that they include calcium carbonate, at least one salt of ethylene acrylic acid, and in that they have a dry extract greater than 65%, preferentially greater than 70%, very preferentially greater than 75%, and even more preferentially between 75 and 78%, of their total weight.

These aqueous dispersions and/or suspensions are also characterised in that the mineral matter and/or the pigments have an average diameter of less than 50 µm, preferentially less than 15 µm, very preferentially less than 5 µm, and even more preferentially in that the average diameter is between 0.3 and 1.7 µm, and even more preferentially is between 0.5 and 0.9 µm, as measured by a Sedigraph™ 5100 device sold by the company MICROMERITICS™.

These aqueous dispersions and/or suspensions are also characterised in that they have a proportion of particles with a diameter of less than 2 µm greater than 60% (as measured by a Sedigraph™ 5100 device sold by the company MICROMERITICS™), or a proportion of particles with a diameter of less than 2 µm greater than 90% (as measured by a Sedigraph™ 5100 device sold by the company MICROMERITICS™), or a proportion of particles with a diameter of less than 2 µm greater than 99% (as measured by a Sedigraph™ 5100 device sold by the company MICROMERITICS™).

These aqueous dispersions and/or suspensions are also characterised in that they have a Brookfield™ viscosity measured at 100 revolutions/minute (at 25° C., with mobile No. 3, with the DVII+ device, in a 1-liter container) of less than 1,000 mPa·s, preferentially less than 700 mPa·s, very preferentially less than 500 mPa·s, and even more preferentially in that this viscosity is between 100 and 300 mPa·s.

These aqueous dispersions and/or suspensions are also characterised in that they have a screen residue greater than 45 µm, of less than 100 ppm, preferentially of less than 70 ppm, more preferentially of less than 60 ppm, and most preferentially of less than 50 ppm.

These aqueous dispersions and/or suspensions are also characterised in that the ethylene acrylic acid salt is a salt which is soluble in aqueous media.

These aqueous dispersions and/or suspensions are also characterised in that the carboxylic groupings of the ethylene acrylic acid salt are partially or totally dissociated from their acid proton.

These aqueous dispersions and/or suspensions are also characterised in that, in the ethylene acrylic acid salt, the mass ratio of ethylene monomer to acrylic acid monomer is between 10:90 and 30:70, and is preferentially equal to 20:80.

These aqueous dispersions and/or suspensions are also characterised in that the ethylene acrylic acid salt has a melt index of between 50 g/10 minutes and 1,500 g/10 minutes, preferentially between 200 g/10 minutes and 300 g/10 minutes when the ethylene acrylic acid salt is totally neutralised, and preferentially between 1,000 g/10 minutes and 1,400 g/10 minutes when the ethylene acrylic acid salt is neutralised at a rate of 70 to 99% (as a proportion of the carboxylic sites), measured according to norm ASTM1238 125° C./2.16 kg.

These aqueous dispersions and/or suspensions are also characterised in that the carboxylic groupings of the said ethylene acrylic acid salts are entirely neutralised or neutralised at a rate of 70 to 99% relative to the total number of the carboxylic sites of the ethylene acrylic acid, with at least one neutralisation agent.

These aqueous dispersions and/or suspensions are also characterised in that the said neutralisation agent includes at least one monovalent cation.

These aqueous dispersions and/or suspensions are also characterised in that the said monovalent cation includes one or more alkali ions and/or one or more amines and/or ammonia.

These aqueous dispersions and/or suspensions are also characterised in that the said neutralisation alkali includes at least one sodium ion.

These aqueous dispersions and/or suspensions are also characterised in that the said amine includes a primary amine.

These aqueous dispersions and/or suspensions are also characterised in that the said amine includes an alkanolamine, including at least one ethanol and/or propanol grouping, and in that the said alkanolamine is then preferentially chosen from among 2-amino-2-methyl-1-propanol and/or dimethylethanolamine, and in that it is very preferentially 2-amino-2-methyl-1-propanol.

These aqueous dispersions and/or suspensions are also characterised in that a quantity of 2-amino-2-methyl-1-propanol is used, so as to contribute a proportion of monovalent cation of between 75 and 125% of the carboxylic groupings of the ethylene acrylic acid, and preferentially so as to contribute a proportion of monovalent cation equal to 100% of the carboxylic groupings of the ethylene acrylic acid.

These aqueous dispersions and/or suspensions are also characterised in that a quantity of dimethyl ethanolamine is used, so as to contribute a proportion of monovalent cation of between 75 and 125% of the carboxylic groupings of the ethylene acrylic acid, and preferentially so as to contribute a proportion of monovalent cation equal to 100% of the carboxylic groupings of the ethylene acrylic acid.

These aqueous dispersions and/or suspensions are also characterised in that the said ethylene acrylic acid has a viscosity of 3,000 to 25,000 mPa·s, 15,000 to 100,000 mPa·s, and 50,000 to 400,000 mPa·s at respective temperatures of 200° C., 170° C. and 140° C.

These aqueous dispersions and/or suspensions are also characterised in that the said ethylene acrylic acid has a viscosity of 3,000 to 7,000 mPa·s, 15,000 to 20,000 mPa·s, and 50,000 to 100,000 mPa·s at respective temperatures of 200° C., 170° C. and 140° C.

These aqueous dispersions and/or suspensions are also characterised in that the said ethylene acrylic acid has a viscosity of 15,000 to 25,000 mPa·s, 50,000 to 100,000 mPa·s, and 300,000 to 400,000 mPa·s at respective temperatures of 200° C., 170° C. and 140° C.

Another object of the invention lies in the dry pigments obtained by the process according to the invention (i.e. after the drying stage d)).

These dry pigments are also characterised in that they contain calcium carbonate, at least one salt of ethylene acrylic acid, of which the calcium carbonate particles have an average diameter of less than 50 µm, preferentially less than 15 µm, very preferentially less than 5 µm, and even more preferentially in that the average diameter is between 0.3 and 1.7 µm, and even more preferentially is between 0.5 and 0.9 µm (as measured by a Sedigraph™ 5100 device sold by the company MICROMERITICS™).

These dry pigments are also characterised in that the calcium carbonate particles have a proportion of particles with a diameter of less than 2 μm greater than 60% (as measured by a Sedigraph™ 5100 device sold by the company MICROMERITICS™), or a proportion of particles with a diameter of less than 2 μm greater than 90% (as measured by a Sedigraph™ 5100 device sold by the company MICROMERITICS™), or a proportion of particles with a diameter of less than 2 μm greater than 99% (as measured by a Sedigraph™ 5100 device sold by the company MICROMERITICS™).

Another object of the invention lies in the use of the aqueous dispersions and suspensions according to the invention, together with dry pigments according to the invention, in the fields of paper, plastic and paints, notably in paper and plastic mass, and in paper and plastic coatings.

EXAMPLES

Example 1

This example illustrates the process according to the invention, in which a natural calcium carbonate is treated by a salt of ethylene acrylic acid during a stage of grinding in an aqueous medium, where a dispersing agent is introduced during the said grinding stage.

In relation thereto, this example starts by describing the copolymers of the ethylene acrylic acid used, followed by the manufacture of certain of their salts.

Note: all the granulometric characteristics of the calcium carbonate suspensions were measured using a device of the Sedigraph™ 5100 type sold by the company MICROMERITICS™.

Copolymer of Ethylene Acrylic Acid a)

This copolymer designates a copolymer of ethylene acrylic acid comprised 20% by weight of acrylic acid and 80% by weight of ethylene.

Copolymer of Ethylene Acrylic Acid b)

This copolymer designates a copolymer of ethylene acrylic acid comprised 20% by weight of acrylic acid and 80% by weight of ethylene.

This copolymer has a melt index of 1,300 g/10 minutes, measured according to norm ASTM 1238 125° C./2.16 kg.

It is well known that a high melt index corresponds to a low molecular weight.

Copolymer of Ethylene Acrylic Acid c)

This copolymer designates a copolymer of ethylene acrylic acid comprised 20% by weight of acrylic acid and 80% by weight of ethylene.

This copolymer has a melt index of 300 g/10 minutes, measured according to norm ASTM 1238 125° C./2.16 kg.

The viscosities (mPa·s) of these different copolymers are indicated in table 1, as a function of temperature. These rheological properties give a basis of comparison of the molecular weights of these copolymers: a low viscosity indicates a low molecular weight.

These viscosity values were measured at the temperatures indicated below with a rheometer sold under the name MCR 300 by the company PHYSICA™ with the following conditions: cone-plane rheometer CP50-1, with a constant shearing rate equal to 5 s$^{-1}$, in a temperature interval ranging from 200° C. to 120° C., in steps of 0.0833° C./s.

TABLE 1 viscosities of the different copolymers of ethylene acrylic acid as a function of temperature

| Temperature (° C.) | Viscosity (mPa · s) of copolymer a) | Viscosity (mPa · s) of copolymer b) | Viscosity (mPa · s) of copolymer c) |
|---|---|---|---|
| 200 | 24,300 | 5,200 | 21,700 |
| 190 | 37,300 | 7,850 | 33,400 |
| 180 | 56,300 | 11,600 | 50,100 |
| 170 | 88,300 | 17,300 | 74,500 |
| 160 | 138,000 | 25,100 | 109,000 |
| 150 | 225,000 | 43,000 | 190,000 |
| 140 | 367,000 | 72,900 | 326,000 |
| 130 | 628,000 | 127,000 | 568,000 |

Solution of Ethylene Acrylic Acid No. 1

500 grams of copolymer a) are added into 2.5 liters of deionised water in a 10-liter reactor of the ESCO type.

While stirring, 123.7 grams of 2-amino-2-methyl-1-propanol (so as to neutralise 100% the carboxylic acid sites of the ethylene acrylic acid) were added, and the blend was heated for one hour at 98° C.

A clear and limpid solution is thus obtained.

Solution of Ethylene Acrylic Acid No. 2

500 grams of copolymer a) are added into 2.5 liters of deionised water in a 10-liter reactor of the ESCO type.

While stirring, 130.2 grams of di-methyl ethanolamine (so as to neutralise 100% the carboxylic acid sites of the ethylene acrylic acid) were added, and the blend was heated for one hour at 98° C.

A clear and limpid solution is thus obtained.

Solution of Ethylene Acrylic Acid No. 3

500 grams of copolymer b) are added into 5 liters of deionised water in a 10-liter reactor of the ESCO type.

While stirring, 38.8 grams of soda (so as to neutralise 75% the carboxylic acid sites of the ethylene acrylic acid) were added, and the blend was heated for one hour at 98° C.

A clear and limpid solution is thus obtained.

Solution of ethylene acrylic acid No. 4

500 grams of copolymer b) are added into 5 liters of deionised water in a 10-liter reactor of the ESCO type.

While stirring, 55.4 grams of soda (so as to neutralise all the carboxylic acid sites of the ethylene acrylic acid) were added, and the blend was heated for one hour at 98° C.

A clear and limpid solution is thus obtained.

Solution of Ethylene Acrylic Acid No. 5

500 grams of copolymer c) are added into 5 liters of deionised water in a 10-liter reactor of the ESCO type.

While stirring, 54.1 grams of soda (so as to neutralise all the carboxylic acid sites of the ethylene acrylic acid) were added, and the blend was heated for one hour at 98° C.

A clear and limpid solution is thus obtained.

Solution of Ethylene Acrylic Acid No. 6

500 grams of copolymer b) are added into 2.5 liters of deionised water in a 10-liter reactor of the ESCO type.

While stirring, 200 grams of ammonia (so as to neutralise 100% the carboxylic acid sites of the ethylene acrylic acid) were added, and the blend was heated for one hour at 98° C.

A clear and limpid solution is thus obtained.

Test No. 1a

This test illustrates the prior art.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 0.65% by dry weight of a homopolymer of acrylic acid neutralised by sodium and magnesium, and of molecular weight equal to 5,400 g/mole, relative to the dry weight of marble.

The grinding required 11 minutes/kg.

An aqueous suspension of marble is obtained the dry extract of which is equal to 75.5%, and the size of the particles of which is such that 90% by weight of them have a diameter of less than 2 μm.

The Brookfield™ viscosity measured at 25° C. and at 100 revolutions/minute with mobile number 3 is 251 mPa·s.

This viscosity is measured on a DVII+ device, in a 1-liter container; this procedure will be used in the other tests.

The screen residue of greater than 45 μm was 40 ppm.

Test No. 1b

This test illustrates the prior art.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, in the presence of 1.0% by dry weight of the solution of ethylene acrylic acid No. 6.

An aqueous suspension of marble is obtained the dry extract of which is equal to 38.0%, and the size of the particles of which is such that 73% by weight of them have a diameter of less than 2 μm. It is impossible to increase the dry extract without impairing the viscosity as indicated below.

The Brookfield™ viscosity measured at 25° C. and at 100 revolutions/minute with mobile number 3 is between 250 and 600 mPa·s.

Test No. 2

This test illustrates the invention.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 0.67% by dry weight of a homopolymer of acrylic acid neutralised by sodium and magnesium, and of molecular weight equal to 5,400 g/mole, relative to the dry weight of marble, and in the presence of 0.5% by dry weight of the solution of ethylene acrylic acid No. 1.

An aqueous suspension of marble is obtained the dry extract of which is equal to 75.7%, and the size of the particles of which is such that 89% by weight of them have a diameter of less than 2 μm.

The Brookfield viscosity measured at 25° C. and at 100 revolutions/minute with mobile number 3 is 150 mPa·s.

The screen residue of greater than 45 μm was 13 ppm.

Test No. 3

This test illustrates the invention.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 1.04% by dry weight of a homopolymer of acrylic acid neutralised by sodium and magnesium, and of molecular weight equal to 5,400 g/mole, relative to the dry weight of marble, and in the presence of 0.5% by dry weight of the solution of ethylene acrylic acid No. 2.

The grinding required 11.3 minutes/kg.

An aqueous suspension of marble is obtained the dry extract of which is equal to 76.1%, and the size of the particles of which is such that 92% by weight of them have a diameter of less than 2 μm.

The Brookfield™ viscosity measured at 25° C. and at 100 revolutions/minute with mobile number 3 is 160 mPa·s.

Test No. 4

This test illustrates the invention.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 1.00% by dry weight of a homopolymer of acrylic acid neutralised by sodium and magnesium, and of molecular weight equal to 5,400 g/mole, relative to the dry weight of marble, and in the presence of 0.5% by dry weight of the solution of ethylene acrylic acid No. 3.

An aqueous suspension of marble is obtained the dry extract of which is equal to 74.1%, and the size of the particles of which is such that 90% by weight of them have a diameter of less than 2 μm.

The Brookfield™ viscosity measured at 25° C. and at 100 revolutions/minute with mobile number 3 is 153 mPa·s.

The screen residue of greater than 45 μm was 59 ppm.

Test No. 5

This test illustrates the invention.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 1.00% by dry weight of a homopolymer of acrylic acid neutralised by sodium and magnesium, and of molecular weight equal to 5,400 g/mole, relative to the dry weight of marble, and in the presence of 0.5% by dry weight of the solution of ethylene acrylic acid No. 4.

An aqueous suspension of marble is obtained the dry extract of which is equal to 77.0%, and the size of the particles of which is such that 91% by weight of them have a diameter of less than 2 μm.

The Brookfield™ viscosity measured at 25° C. and at 100 revolutions/minute with mobile number 3 is 157 mPa·s.

Test No. 6

This test illustrates the invention.

It uses a marble of Norway, the average diameter of the particles of which is equal to 45 μm.

This marble was ground in an aqueous medium in a grinder of the Dynomill™ type of 1.4 liters with 2,700 grams of zirconium dioxide-based grinding balls of diameter of between 0.6 and 1 mm, and in the presence of 1.00% by dry weight of a homopolymer of acrylic acid neutralised by sodium and magnesium, and of molecular weight equal to 5,400 g/mole, relative to the dry weight of marble, and in the presence of 0.5% by dry weight of the solution of ethylene acrylic acid No. 5.

An aqueous suspension of marble is obtained the dry extract of which is equal to 76.9%, and the size of the particles of which is such that 89% by weight of them have a diameter of less than 2 μm.

The Brookfield™ viscosity measured at 25° C. and at 100 revolutions/minute with mobile number 3 is 187 mPa·s.

The results demonstrate that the process according to the invention leads to suspensions of calcium carbonate treated with a salt of ethylene acrylic acid and a dispersing agent, having a high dry extract, and notably greater than 75%.

In addition, this dry extract is greater than that obtained in the process according to the prior art, and the Brookfield™ viscosities measured at 25° C. and at 100 revolutions/minute are lower than those obtained in the case of the prior art.

In addition, it was demonstrated that the grinding is as efficient with or without ethylene acrylic acid, by a comparison between tests No. 1 a and 3.

In addition, no example according to the invention presented a problem of creation of foam in the calcium carbonate suspension.

Moreover, it was observed that the screen residues obtained in the case of the invention were completely negligible.

Test No. 7

This test illustrates the prior art.

A high-density polyethylene of the company BASELL™ POLYOLEFINS sold under the name Hostalen™ GM 9240 HT was introduced into a roll mill sold under the name Walzwerk 150×400 of the company DR. COLLIN.

After this, plates 2 and 4 mm in thickness were formed in a "Testing Platen Presses Type P" P300-P press of the company DR. COLLIN.

Test No. 8

This test illustrates the invention.

The suspension of test No. 5 was dried with an MSD™ 100 pulveriser of the company NIRO™. A dry treated marble is obtained, the size of the particles of which is such that 88% by weight of them have a diameter of less than 2 µm.

The treated and dry marble was then blended at 180° C. with a high-density polyethylene of the company BASELL™ POLYOLEFINS sold under the name Hostalen™ GM 9240 HT in a roll mill sold under the name Walzwerk 150×400 of the company DR. COLLIN. The composition of the blend has equal masses of the treated product and of the high-density polyethylene.

After this, plates 2 and 4 mm in thickness were formed in a "Testing Platen Presses Type P" P300-P press of the company DR. COLLIN.

The traction resistances of the plates formed for tests No. 7 and 8 are equal respectively to 23.9 N/mm$^2$ and 24.2 N/mm$^2$ according to norm DIN 53455.

It is observed that the replacement of part of the polyethylene by the pigment according to the invention does not reduce the traction resistance.

The invention claimed is:

1. An aqueous suspension or dispersion of mineral matter comprising calcium carbonate and at least one salt of ethylene acrylic acid, wherein the carboxylic groupings of the ethylene acrylic acid salt are entirely neutralized or neutralized at a rate of 70 to 99% relative to the total number of the carboxylic sites of the ethylene acrylic acid, with at least one neutralization agent that includes one or more amines, wherein the suspension or dispersion has a dry weight of greater than 65% based on the total weight of the aqueous suspension or dispersion of mineral matter, wherein the ethylene acrylic acid salt has a mass ratio of ethylene monomer to acrylic acid monomer of between 10:90 and 30:70, wherein the ethylene acrylic acid salt has a melt index of between 50 g/10 minutes and 1,500 g/10 minutes when the ethylene acrylic acid salt is totally neutralized, and wherein the ethylene acrylic acid salt has a melt index of between 1,000 g/10 minutes and 1,400 g/10 minutes when the ethylene acrylic acid salt is neutralized at a rate of 70 to 99%.

2. The aqueous suspension or dispersion of mineral matter according to claim 1, wherein the salt of the ethylene acrylic acid is present at a dry weight percent of 0.2 to 2% based on the dry weight of mineral matter.

3. The aqueous suspension or dispersion of mineral matter according to claim 1, wherein the amine includes one primary amine.

4. The aqueous suspension or dispersion of mineral matter according to claim 1, wherein the amine is an alkanolamine.

5. The aqueous suspension or dispersion of mineral matter according to claim 1, wherein the amine is 2-amino-2-methyl-1-propanol and/or dimethylethanolamine.

6. The aqueous suspension or dispersion of mineral matter according to claim 1, wherein the amine is 2-amino-2-methyl-1-propanol.

7. The aqueous suspension or dispersion of mineral matter according to claim 1, wherein the amine is dimethylethanolamine.

8. The aqueous suspension or dispersion of mineral matter according to claim 1, having a dry weight of greater than 70% based on the total weight of the aqueous suspension or dispersion of mineral matter.

9. The aqueous suspension or dispersion of mineral matter according to claim 1, having a dry weight of greater than 75% based on the total weight of the aqueous suspension or dispersion of mineral matter.

10. The aqueous suspension or dispersion of mineral matter according to claim 1, having a dry weight of between 75 and 78% based on the total weight of the aqueous suspension or dispersion of mineral matter.

11. The aqueous suspension or dispersion of mineral matter according to claim 1, wherein the mineral matter comprises natural and/or precipitated calcium carbonate.

12. The aqueous suspension or dispersion of mineral matter according to claim 1, wherein the mineral matter comprises natural calcium carbonate.

13. The aqueous suspension or dispersion of mineral matter according to claim 1, wherein the mineral matter includes, in addition to calcium carbonate, at least one other mineral matter selected from a dolomite, a bentonite, a kaolin, talc, cement, gypsum, lime, magnesia, titanium dioxide, satin white, aluminium trioxide, aluminium trihydroxide, a silica, mica, a talc-calcium carbonate blend, a calcium carbonate-kaolin blend, a blend of calcium carbonate with aluminium trihydroxide or aluminium trioxide, a blend of calcium carbonate with a synthetic or natural fiber, a mineral costructure, a talc-calcium carbonate costructure, or a talc-titanium dioxide costructure, or any blend thereof.

14. The aqueous suspension or dispersion of mineral matter according to claim 1, wherein the mineral matter comprises greater than or equal to 70% of calcium carbonate based on the total dry weight of the mineral matter.

15. The aqueous suspension or dispersion of mineral matter according to claim 1, wherein the mineral matter has an average diameter of less than 15 µm.

16. The aqueous suspension or dispersion of mineral matter according to claim 1, wherein the mineral matter has an average diameter of less than 5 µm.

17. The aqueous suspension or dispersion of mineral matter according to claim 1, wherein the mineral matter has an average diameter of between 0.3 and 1.7 µm.

18. The aqueous suspension or dispersion of mineral matter according to claim 1, wherein the mineral matter has an average diameter of between 0.9 and 0.9 µm.

19. The aqueous suspension or dispersion of mineral matter according to claim 1, wherein greater than 60% of particles of the mineral matter has a diameter of less than 2 µm.

20. The aqueous suspension or dispersion of mineral matter according to claim 1, wherein greater than 90% of particles of the mineral matter has a diameter of less than 2 µm.

21. The aqueous suspension or dispersion of mineral matter according to claim 1, wherein greater than 99% of particles of the mineral matter has a diameter of less than 2 µm.

22. The aqueous suspension or dispersion of mineral matter according to claim 1, having a Brookfield viscosity of less than 1,000 mPa·s measured at 100 rpms at 25° C.

23. The aqueous suspension or dispersion of mineral matter according to claim 1, having a Brookfield viscosity of less than 500 mPa·s measured at 100 rpms at 25° C.

24. The aqueous suspension or dispersion of mineral matter according to claim 1, having a Brookfield viscosity of between 100 and 300 mPa·s measured at 100 rpms at 25° C.

25. The aqueous suspension or dispersion of mineral matter according to claim 1, wherein the salt of ethylene acrylic acid is a salt soluble in an aqueous medium.

26. The aqueous suspension or dispersion of mineral matter according to claim 1, wherein the ethylene acrylic acid salt has a melt index of between 200 g/10 minutes and 300 g/10 minutes when the ethylene acrylic acid salt is totally neutralized.

27. The aqueous suspension or dispersion of mineral matter according to claim 1, which further comprises a dispersing and/or grinding aid agent.

28. The aqueous suspension or dispersion of mineral matter according to claim 1, wherein the dispersing and/or grinding aid agent is present at a dry weight percent of 0.1 to 2% based on the dry weight of the mineral matter.

29. The aqueous suspension or dispersion of mineral matter according to claim 27, wherein the dispersing agent and/or grinding aid agent is a homopolymer of acrylic acid and/or a copolymer of acrylic acid with a water-soluble monomer selected from methacrylic acid, maleic acid, itaconic acid, crotonic acid, fumaric acid, isocrotonic acid, aconitic acid, mesaconic acid, sinapic acid, undecylenic acid, angelic acid, canellic acid and/or 2-acrylamido 2-methyl propane sulfonic acid in acid form or partially neutralized, or acrylamide, methylacrylamide, an ester of an acrylic or methacrylic acid, acrylate phosphate, ethylene methacrylate, propylene glycol, vinylpyrrolidone, vinylcaprolactame, vinyl acetate, sodium styrene sulfonate, allylamine, or derivative thereof.

* * * * *